(12) United States Patent
Troff et al.

(10) Patent No.: US 9,367,044 B2
(45) Date of Patent: *Jun. 14, 2016

(54) CLEANING APPLIANCE IN WHICH ACCESS IS GRANTED BASED ON AN AUTHORIZATION CARRIER AND AUTHORIZATION PROFILE

(71) Applicant: Alfred Kärcher GmbH & Co. KG, Winnenden (DE)

(72) Inventors: Gilles Troff, Stuttgart (DE); Frank Stadelmann, Winnenden (DE); Bernd Noller, Bad Schoenborn (DE); Rainer Schaefer, Leutenbach (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 69 days.

This patent is subject to a terminal disclaimer.

(21) Appl. No.: 13/749,597

(22) Filed: Jan. 24, 2013

(65) Prior Publication Data

US 2013/0141211 A1 Jun. 6, 2013

Related U.S. Application Data

(63) Continuation of application No. PCT/EP2011/062568, filed on Jul. 21, 2011.

(30) Foreign Application Priority Data

Jul. 26, 2010 (DE) .......................... 10 2010 038 420

(51) Int. Cl.
*G05B 1/01* (2006.01)
*A47L 11/40* (2006.01)
*G07C 9/00* (2006.01)

(52) U.S. Cl.
CPC ............... *G05B 1/01* (2013.01); *A47L 11/4008* (2013.01); *A47L 11/4011* (2013.01); *G07C 9/00007* (2013.01)

(58) Field of Classification Search
CPC .. A47L 11/4008; A47L 11/4011; G05B 1/01; G07C 9/00007
USPC ........... 340/5.21; 235/375; 348/734; 455/411
See application file for complete search history.

(56) References Cited

U.S. PATENT DOCUMENTS 3,142,771 A * 7/1964 Wendt ........................... 307/115
3,379,295 A 4/1968 Varley
(Continued)

FOREIGN PATENT DOCUMENTS

DE 1 096 242 12/1960
DE 23 60 597 6/1975
(Continued)

*Primary Examiner* — Fekadeselassie Girma
*Assistant Examiner* — Stephen Burgdorf
(74) *Attorney, Agent, or Firm* — Womble Carlyle Sandridge & Rice LLP

(57) ABSTRACT

The invention relates to a cleaning appliance, wherein in order to access same, an access authorization stored on an authorization carrier is required, the appliance including two or more authorization carriers with access authorizations stored thereon which are linked to different authorization profiles, and a detection unit for detecting the access authorization of an authorization carrier, wherein a range of functions dependent on the authorization profile linked to the access authorization can be provided to an operator by the cleaning appliance. In order to provide such a cleaning appliance which is more user-friendly in operation, it is proposed that each authorization carrier comprises an identification device for providing an identifier which is associated with the particular authorization profile of the authorization carrier and which is perceivable by the operator using a sensory organ, wherein identifiers associated with different authorization profiles are different from one another.

7 Claims, 5 Drawing Sheets

(56) References Cited

U.S. PATENT DOCUMENTS

| | | | |
|---|---|---|---|
| 3,569,981 A | 3/1971 | Hampton et al. | |
| 4,077,242 A | 3/1978 | Sedley | |
| 4,477,874 A * | 10/1984 | Ikuta | B60N 2/0248 307/10.7 |
| 4,492,002 A | 1/1985 | Waldhauser et al. | |
| 4,707,788 A * | 11/1987 | Tashiro et al. | 701/49 |
| 4,805,258 A | 2/1989 | Sitarski et al. | |
| 4,821,107 A * | 4/1989 | Naito et al. | 358/440 |
| 5,032,775 A * | 7/1991 | Mizuno | B08B 3/024 15/319 |
| 5,161,394 A * | 11/1992 | Felzer et al. | 68/23 R |
| 5,187,665 A | 2/1993 | Futami et al. | |
| 5,214,556 A * | 5/1993 | Kilbel | 360/137 |
| 5,311,757 A | 5/1994 | Spahn | |
| 5,775,148 A | 7/1998 | Layton et al. | |
| 5,831,827 A | 11/1998 | Fekete et al. | |
| 6,021,494 A | 2/2000 | Bolan et al. | |
| 6,430,488 B1 | 8/2002 | Goldman et al. | |
| 6,649,139 B2 | 11/2003 | Tanaka et al. | |
| 7,096,496 B1 | 8/2006 | Challener et al. | |
| 8,983,661 B2 * | 3/2015 | Cho | A47L 9/2805 15/319 |
| 2001/0034257 A1 | 10/2001 | Weston et al. | |
| 2002/0152576 A1 * | 10/2002 | Murray | A47L 9/00 15/319 |
| 2003/0151494 A1 | 8/2003 | Kent | |
| 2004/0246095 A1 | 12/2004 | Berger et al. | |
| 2004/0252014 A1 | 12/2004 | Emmerling et al. | |
| 2005/0234381 A1 | 10/2005 | Niemetz et al. | |
| 2006/0103523 A1 | 5/2006 | Field | |
| 2007/0225860 A1 | 9/2007 | Sheppard et al. | |
| 2008/0113709 A1 | 5/2008 | Beadell et al. | |
| 2008/0176645 A1 | 7/2008 | Griswold et al. | |
| 2008/0235614 A1 * | 9/2008 | Ricklefs et al. | 715/783 |
| 2008/0283585 A1 * | 11/2008 | Peterman et al. | 235/375 |
| 2009/0027161 A1 | 1/2009 | Kent | |
| 2009/0065578 A1 * | 3/2009 | Peterson | G05B 19/048 235/382 |
| 2009/0078762 A1 * | 3/2009 | Forster et al. | 235/385 |
| 2009/0132090 A1 | 5/2009 | Kaczmarz et al. | |
| 2009/0309699 A1 | 12/2009 | Pöllabauer | |
| 2010/0044441 A1 | 2/2010 | Cohen et al. | |
| 2010/0154484 A1 * | 6/2010 | Skoric et al. | 68/13 R |
| 2010/0180397 A1 | 7/2010 | Schuetz et al. | |
| 2011/0084840 A1 | 4/2011 | Mercier et al. | |
| 2011/0090277 A1 * | 4/2011 | Pomerantz et al. | 347/20 |
| 2011/0161573 A1 * | 6/2011 | Cheng | 711/103 |
| 2012/0154116 A1 | 6/2012 | Duenne et al. | |

FOREIGN PATENT DOCUMENTS

| | | | |
|---|---|---|---|
| DE | 43 29 677 A1 | 3/1995 | |
| DE | 295 16 666 U1 | 2/1996 | |
| DE | 296 04 605 U1 | 7/1996 | |
| DE | 195 37 605 A1 | 4/1997 | |
| DE | 297 20 720 | 3/1999 | |
| DE | 197 53 086 A1 | 6/1999 | |
| DE | 200 03 816 | 4/2000 | |
| DE | 100 46 699 | 4/2002 | |
| DE | 101 07 166 | 8/2002 | |
| DE | 10 2004 006 947 | 9/2005 | |
| DE | 10 2005 042 830 | 3/2007 | |
| DE | 10 2009 038 304 | 3/2010 | |
| EP | 0 844 030 A2 | 5/1998 | |
| EP | 1 315 128 A1 | 5/2003 | |
| EP | 1 593 334 A2 | 11/2005 | |
| GB | 2 076 181 | 11/1981 | |
| GB | 2 352 057 A | 1/2001 | |
| GB | 2 353 180 A | 2/2001 | |
| WO | WO 9952748 A1 * | 10/1999 | B60R 25/00 |
| WO | WO 00/65602 | 11/2000 | |
| WO | WO 01/20923 | 3/2001 | |
| WO | WO 02/13153 | 2/2002 | |
| WO | WO 02/077927 | 10/2002 | |

* cited by examiner

CLEANING APPLIANCE IN WHICH ACCESS IS GRANTED BASED ON AN AUTHORIZATION CARRIER AND AUTHORIZATION PROFILE

CROSS-REFERENCE TO RELATED APPLICATIONS

This application is a continuation of international application No. PCT/EP2011/062568, filed on Jul. 21, 2011, which claims priority to German application number DE 10 2010 038 420.8, filed Jul. 26, 2010. The contents of both applications are incorporated by reference herein in their entirety and for all purposes.

FIELD OF THE INVENTION

The present invention relates to a cleaning appliance, wherein in order to access same, an access authorization stored on an authorization carrier is required, the appliance comprising two or more authorization carriers with access authorizations stored thereon which are linked to different authorization profiles, and a detection unit for detecting the access authorization of an authorization carrier, wherein a range of functions dependent on the authorization profile linked to the access authorization can be provided to an operator by the cleaning appliance.

BACKGROUND OF THE INVENTION

In this type of cleaning appliance, access control is obtained using an authorization carrier, for example a key or an authorization card, on which an access authorization is stored. For the purpose of access control, it must be ensured that only an authorized, trained user operates the cleaning appliance. This avoids improper operation and an associated risk not only of damage to the cleaning appliance, but also of injury to the operator or third parties. Examples of cleaning appliances requiring access authorization are scrubber vacuums, mobile sweepers, and cleaning appliances which operate by means of a cleaning jet, in particular heatable high-pressure cleaners or particle blasting devices such as dry ice blasters.

The cleaning appliance of the generic kind includes two or more authorization carriers of different authorization profiles, wherein in the present context, "authorization profile of the authorization carrier" is the authorization profile which is linked to the access authorization stored on the authorization carrier. The range of functions of the cleaning appliance is determined based on the authorization profile. Thus, for example, it may be provided that an authorization carrier provided for operators with "standard experience" grants access to the most common functions of the cleaning appliance. More experienced operators may be provided with authorization carriers, the authorization profile of which grants access to further functions of the cleaning appliance. Lastly, authorization carriers provided for maintenance personnel may be provided, by use of which the entire range of functions of the cleaning appliance may be utilized.

The authorization profile of an authorization carrier may be a component of the access authorization, or it may likewise be stored on the authorization carrier and detected by the detection unit together with the access authorization. It is also conceivable for the detection unit to transmit the access authorization to a control unit of the cleaning appliance which, based on information stored in a memory element of the cleaning appliance, is able to determine which authorization profile is linked to the transmitted access authorization. Functional units of the cleaning appliance, for example a cleaning tool, a dirt pick-up device, a cleaning agent dispensing device, etc., may then be controlled by the control unit in dependence on the authorization profile.

An object underlying the present invention is to provide a cleaning appliance of the type mentioned at the outset which is more user-friendly in operation.

SUMMARY OF THE INVENTION

In an aspect of the invention a cleaning appliance is provided, wherein in order to access same, an access authorization stored on an authorization carrier is required, the appliance comprising two or more authorization carriers with access authorizations stored thereon which are linked to different authorization profiles, and a detection unit for detecting the access authorization of an authorization carrier, wherein a range of functions dependent on the authorization profile linked to the access authorization can be provided to an operator by the cleaning appliance. Each authorization carrier comprises an identification device for providing an identifier which is associated with the particular authorization profile of the authorization carrier and which is perceivable by the operator using a sensory organ, wherein identifiers associated with different authorization profiles are different from one another.

BRIEF DESCRIPTION OF THE DRAWING FIGURES

The foregoing summary and the following description may be better understood in conjunction with the drawing figures, of which:

DETAILED DESCRIPTION OF PREFERRED EMBODIMENTS OF THE INVENTION

Figure 1:
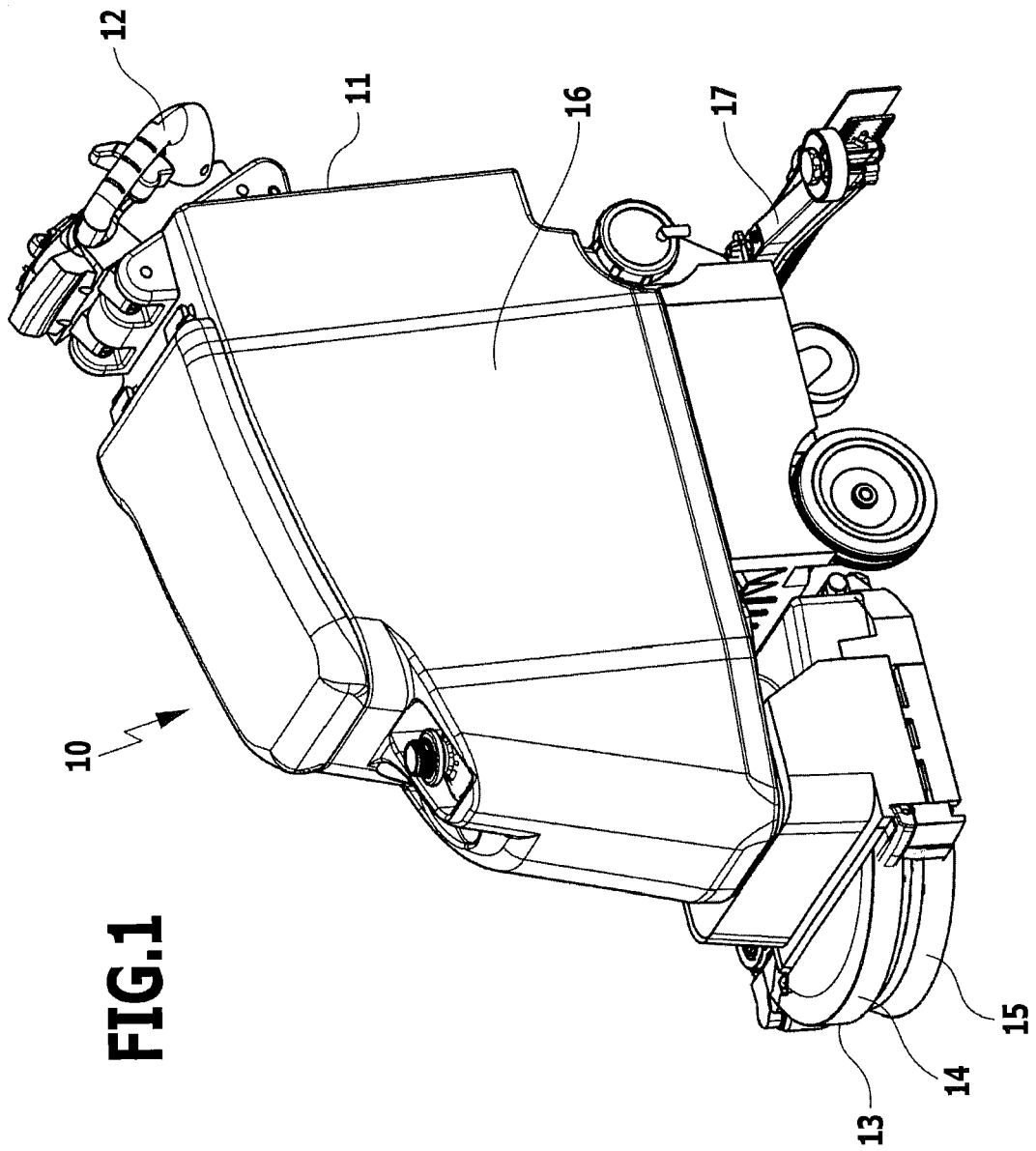
FIG. 1 shows a perspective view of a cleaning appliance according to an aspect of the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a cleaning appliance, wherein in order to access same, an access authorization stored on an authorization carrier is required, the appliance comprising two or more authorization carriers with access authorizations stored thereon which are linked to different authorization profiles, and a detection unit for detecting the access authorization of an authorization carrier, wherein a range of functions dependent on the authorization profile linked to the access authorization can be provided to an operator by the cleaning appliance. Each authorization carrier comprises an identification device for providing an identifier which is associated with the particular authorization profile of the authorization carrier and which is perceivable by the operator using a sensory organ, wherein identifiers associated with different authorization profiles are different from one another.

In the cleaning appliance according to the an aspect of the invention, the operator may easily determine, using a sensory organ and based on the identifier which is providable by the identification device, what type of authorization profile is linked to the access authorization stored on the authorization carrier. To determine the authorization profile of the authorization carrier, it is in particular not necessary to put the cleaning appliance into operation in order to check, in the worst case, all authorization carriers as to whether they have the authorization profile expected by the operator. This simplifies operation of the cleaning appliance for the operator.

It is advantageous for the cleaning appliance to comprise a plurality of authorization carriers having the same authorization profile, and for the plurality of authorization carriers to have identical identifiers, so as to simplify handling of the authorization carriers and operation of the cleaning appliance. In particular, an unambiguous association of the identifier and the authorization profiles with one another may be achieved in this way.

The identifiers of all authorization carriers are preferably perceivable using the same sensory organ in order to simplify handling of the authorization carriers, and thus, of the cleaning appliance, for operators. The operator may thus become accustomed more quickly to the fact that the authorization profile may be deduced based on an identifier which is always perceivable by the same sensory organ.

It is advantageous if at least one identification device is an optical identification device having a visually perceivable identifier; i.e., the identifier provided by the optical identification device is detectable by the operator's sense of vision. An optical identification device, for example a display unit, allows the identifier to be reliably perceived. The identification devices of all authorization carriers are advantageously optical identification devices.

In an embodiment of the cleaning appliance which has particular ease of handling, the visually perceivable identifier is a color, for example a basic color such as yellow or green. Also possible is a specific color of a color system, for example a specific Pantone color. A colored identifier of the authorization carrier, which may be present, for example, in completely or partially colored form, is perceivable in a particularly user-friendly manner.

Similarly, it may be provided that the identifier comprises a color, and is present, for example, in a specific spatial configuration of a plurality of colors, such as a color gradient.

At least one identification device is preferably a haptic identification device having an identifier which is perceivable by touch; i.e., the identifier provided by the haptic identification device is detectable by the operator's sense of touch. In practice, this type of identifier may also be detected in a user-friendly and reliable manner. It may be provided in particular that the identification devices of all authorization carriers are haptic identification devices having identifiers which are detectable by touch.

The identifier which is perceivable by touch advantageously comprises elevations and/or depressions which are formed on the authorization carrier. This type of identifier has a simple design, and may be reliably perceived in practice.

It may also be provided that an identifier which is perceivable by touch is characterized in that the authorization carrier comprises no elevations and/or depressions, and accordingly has a smooth surface characteristic.

In addition to the above-mentioned optical and haptic identification devices it may also be provided that the identification device is at least one each of an acoustic identification device having an identifier which is perceivable by the sense of hearing, an olfactory identification device having an identifier which is perceivable by the sense of smell, and a gustatory identification device having an identifier which is perceivable by the sense of taste. In practice, however, optical and haptic identification devices have proven to be more reliable with regard to perceiving the particular identifiers.

The at least one identification device is preferably a static identification device having an always perceivable identifier. In the present context, "always perceivable" means that the identifier is provided by the identification device without a prior request by the operator, for example, activation of the authorization carrier for outputting the identifier. For the operator, this simplifies handling of the authorization carrier and perceiving the identifier. The identification devices of all authorization carriers are particularly preferably static identification devices.

It is advantageous if the identifier of at least one authorization carrier, and preferably of all authorization carriers, is situated on a surface of the authorization carrier or the authorization carriers. This allows an identifier for each authorization carrier which has a simple design and is easy to perceive. The surface thereof forms, at least in part, an identifier area on which the identifier is situated. Examples of authorization carriers indicated at the surface are authorization carriers which at the surface are at least partially colored and/or provided with depressions and/or elevations. The corresponding identification device of such an authorization carrier is formed, for example, by the surface and also by at least one characterizing element, such as a colored layer or a profile, present thereon.

The identifier particularly preferably extends over the entire surface of the authorization carrier, but not necessarily its edges, corners, or the like. This involves a type of identifier having a particularly simple design, which is also perceivable by the operator in a particularly reliable manner. For example, the entire surface of the authorization carrier is colored, authorization carriers having different authorization profiles being colored differently. Similarly, it may be provided that the entire surface of an authorization carrier is provided with depressions and/or elevations, authorization carriers of different authorization profiles comprising different types of elevations and/or depressions, or managing entirely without elevations and/or depressions.

It is advantageous for the identifier of at least one authorization carrier to be unchanging with respect to space and/or time in order to obtain the identifier in a technically simple manner.

In particular for a visually perceivable identifier and/or for a haptically perceivable identifier, it is advantageous for the identifier to be spatially uniform, and, for example, to extend uniformly and evenly over the surface of the authorization carrier.

As mentioned above, the access authorization of each authorization carrier may be detected by the detection unit of the cleaning appliance. It is advantageous for the two or more authorization carriers to be transponders, each having a memory element for the access authorization, and for the access authorization to be detectable in each case in a contactless manner by means of the detection unit. This allows user-friendly, contactless access control, so that mechanical detection of the access authorization, in particular by means of a key, may be dispensed with. The cleaning appliance and the authorization carriers may interact by means of RFID technology, the detection unit preferably being configured as an active RFID reader. The authorization carriers may in each case be passive RFID transponders. In particular when the authorization carriers are configured as transponders, the identifier which is perceivable by the sensory organ is particularly advantageous, since the access authorization which is stored on the particular authorization carrier is stored in the memory element. The memory element is not readable by the operator without the aid of technical devices.

It is advantageous if the cleaning appliance includes a playback device for providing authorization information which is perceivable by the operator using a sensory organ, the authorization information being associated with the authorization profile of an authorization carrier used by the operator for accessing the cleaning appliance. Based on the authorization information, which may likewise be perceived by the operator in a user-friendly manner using a sensory organ, a control option is provided for the operator. The authorization information allows the operator to determine whether the authorization profile of the authorization carrier used by the operator is the authorization profile expected by the operator, or whether a misidentification of the authorization carrier or an error by the operator concerning the identifier thereof is possibly present.

For user-friendly handling using the authorization carriers and the cleaning appliance, it is advantageous if the same sensory organ is responsive to the authorization information of the playback device and to the identifier of the identification device.

In practice, it proves advantageous for the playback device to include an optical display unit for providing visually perceivable authorization information. The authorization information may thus be easily perceived by the operator via the sense of vision. The use of a display unit allows a configuration of the playback device having a simple design. For this purpose, a display unit may be used, which in particular is already present on the cleaning appliance and which displays status information for the cleaning appliance.

In the case of an identifier of the authorization profile of the authorization carrier based on a color, the authorization information is preferably a display color of the display unit, whereby the display color may be a background color or a foreground color, such as a text color, of the display unit. In practice, the authorization information which is provided by means of a display color and is associated with the authorization profile of the authorization carrier proves to be perceivable in a simple and reliable manner.

In the latter-mentioned embodiment, the perception of the authorization information by the operator is even more simple and reliable if the color of the identifier and the display color match. In particular, it may be provided that for a colored identifier of the authorization profile on each authorization carrier, the authorization information in every case is a display color which matches the identifier color.

A cleaning appliance according to an aspect of the invention may be configured as a floor cleaning machine, for example as a scrubber vacuum or a mobile sweeper, both as so-called "walk-behind" machines in which the operator controls the machines from the rear, and also as ride-on machines.

A preferred embodiment of a cleaning appliance according to the invention is configured as a scrubber vacuum, which is illustrated in perspective in FIG. 1 and denoted overall by reference numeral 10. The scrubber vacuum 10 is a so-called "walk-behind" machine which an operator controls from the rear 11 of the machine with the aid of an operating unit 12 situated thereon.

At its front 13, the scrubber vacuum 10 has a cleaning tool 14 with a rotary disk brush 15, by means of which dirt may be removed from a floor surface to be cleaned. To increase the cleaning action, the floor surface may be acted on by a cleaning fluid, such as water, contained in a tank 16 of the scrubber vacuum 10. At the rear 11, the scrubber vacuum 10 includes a dirt pick-up device 17 for suctioning the mixture of removed dirt and water from the floor surface.

The operating unit 12 illustrated in a top view in FIG. 2 includes a plurality of operating elements 18 to 22, which are not discussed in greater detail below, for receiving operating instructions from an operator. The operating unit 12 also includes a playback device 23 having an optical display unit 24, by means of which information concerning the state of the scrubber vacuum 10 is displayable. The display unit 24 in particular includes a color display which may display a multiplicity of colors.

The operating unit 12 is in operative connection with a control unit 25 of the scrubber vacuum 10 which, among other things, may control the display unit 24 and receive instructions from the operator on the operating elements 18 to 22. In addition, the control unit 25 is electrically coupled to a memory unit 26, which is discussed in greater detail below.

In addition, the control unit 25 is in operative connection with a detection unit 27. The detection unit 27 is configured as an RFID reader 28 which is situated beneath a cover of the operating unit 12, to the side of the display unit 24. The RFID reader 28 is designed for contactless detection, known per se, of access authorizations on authorization carriers, to be described below, which grant access to the scrubber vacuum 10.

The control unit 25 is also electrically coupled to a switch 29, for example a microswitch. The switch 29 (not shown in FIG. 2) is situated on a receptacle 30 in the form of an insertion slot 31. The receptacle 30 is situated to the side of the display unit 24 and above the detection unit 27.

Figure 2:
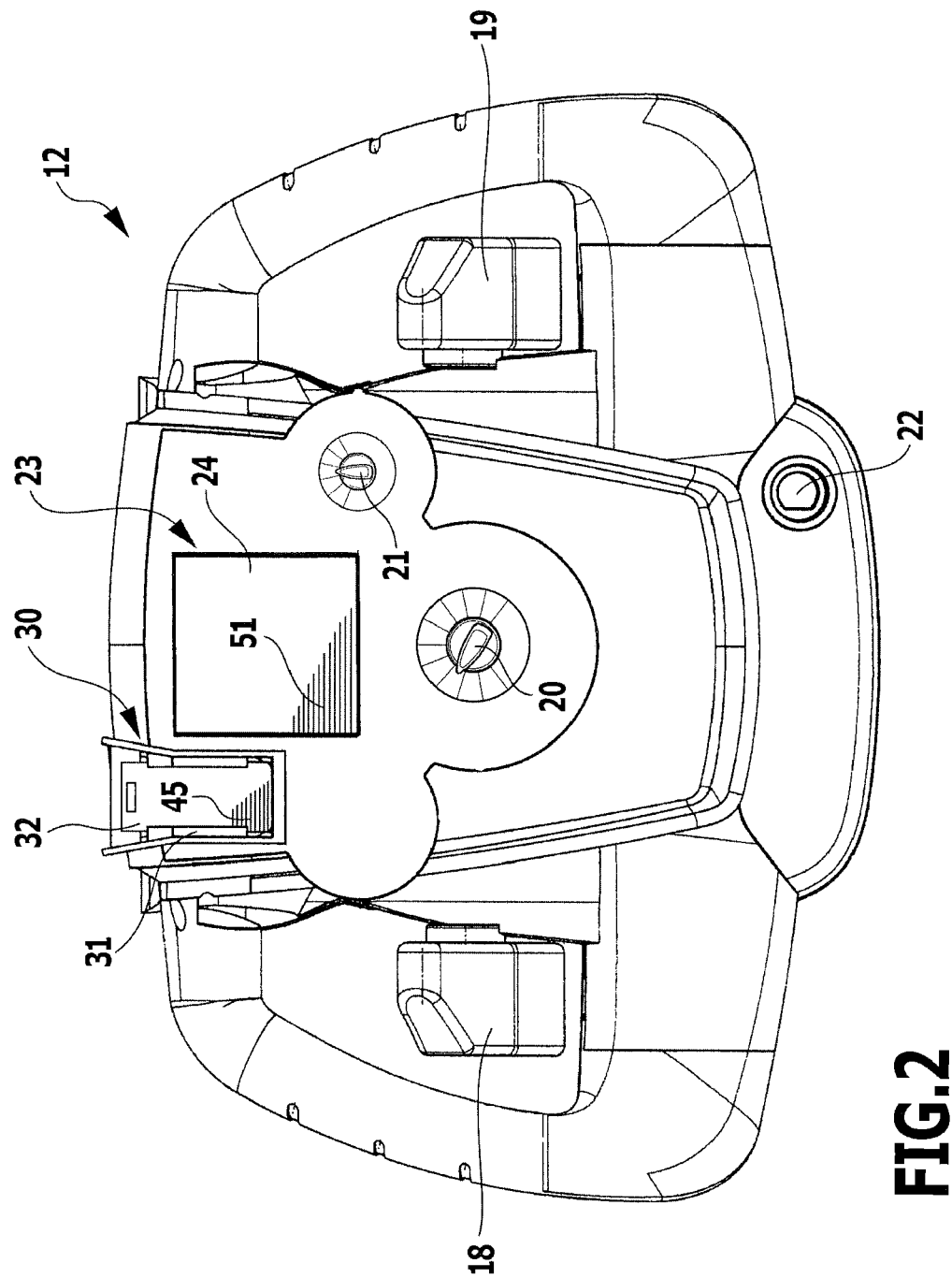
FIG. 2 shows a top view of an operating unit of the cleaning appliance from FIG. 1.
Figure 5:
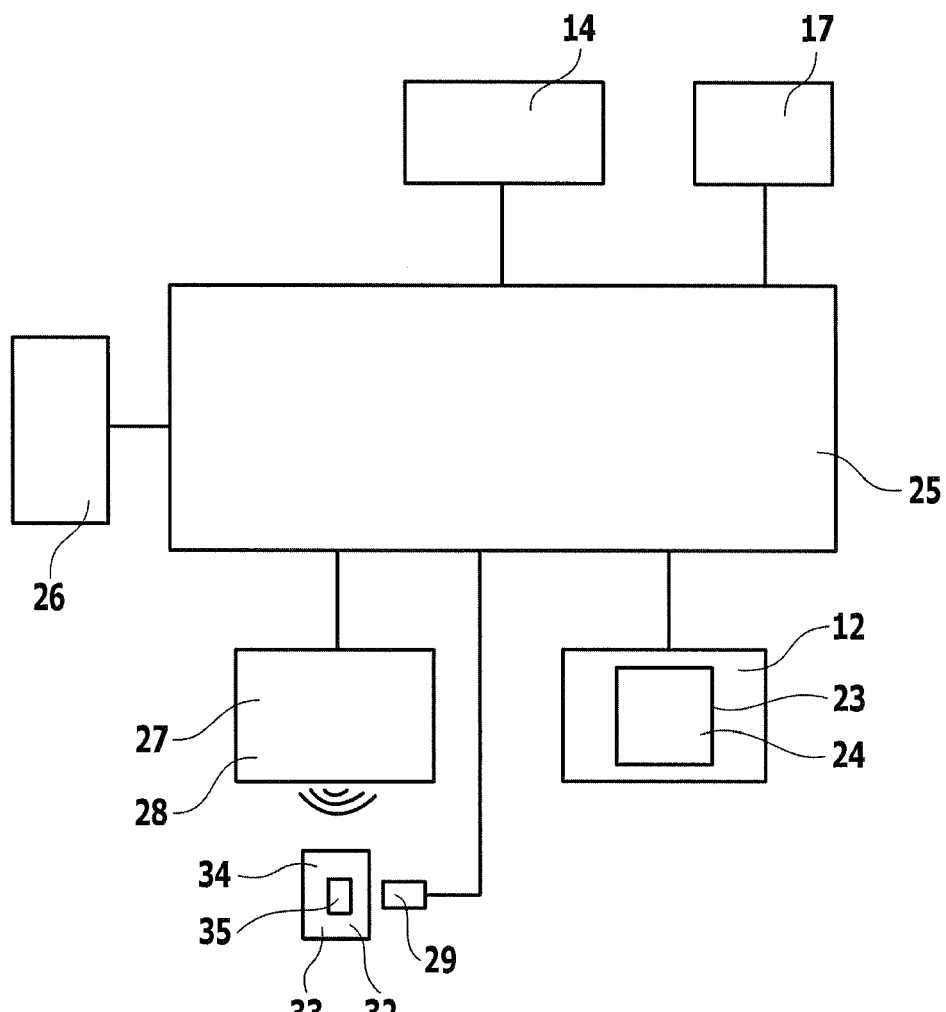
FIG. 5 shows a block diagram of electrically active components of the cleaning appliance from FIG. 1.

Various authorization carriers, for example the authorization carrier 32 illustrated in FIG. 2 and schematically illustrated in FIG. 5, may be removably mounted in the insertion slot 31. The authorization carrier 32 is configured in the form of an authorization card 33 in a check card format. In particular, the authorization carrier 32 is a transponder 34 having a memory element 35 which is readable via RFID technology.

Stored in the memory element 35 is an access authorization which grants access to the functions of the scrubber vacuum 10. To obtain access, the operator must place the authorization carrier 32 in the insertion slot 31, thus activating the switch 29. The control unit 25 then activates the detection unit 27, which reads the access authorization from the memory element 35 via RFID technology. The access authorization is transmitted to the memory unit 26.

The access authorization is checked for validity in the memory unit 26. In addition, an authorization profile which is linked to the access authorization is read from the memory unit 26 in which the authorization profile is stored. The authorization carrier 32 has the authorization profile, which is associated with the access authorization stored in the memory element 35. Alternatively, it may be provided that the authorization profile of the authorization carrier 32 is also stored in the memory element 35 in addition to the access authorization, and may also be read by the detection unit 27. It is also possible for the authorization profile to be a component of the access authorization.

The authorization profile of the authorization carrier 32 stores which of the totality of available functions of the scrubber vacuum 10 may be accessed by the operator holding the authorization carrier 32. For example, it may be provided that it is stored in the authorization profile that the operator may use only selected functional units of the scrubber vacuum 10, for example the cleaning tool 14 and the dirt pick-up device 17, which likewise are controllable by the control unit 25. It is also conceivable that the operator is able to use functional units such as the cleaning tool 14 and the dirt pick-up device 17 with current cleaning parameters, but is not able to change these cleaning parameters. It is also possible that it is stored in the authorization profile whether the operator is authorized to transmit software updates to the control unit 25 via an interface, not illustrated in the drawing.

Providing an authorization profile which is linked to the access authorization allows operators to carry out various functions of the scrubber vacuum 10, depending, for example, on the range of duties, level of knowledge, and experience in handling the scrubber vacuum 10. To this end, the scrubber vacuum 10 includes a group of three authorization carriers, which in addition to the previously mentioned authorization carrier 32 comprise two further authorization carriers 36 and 37.

From a technical standpoint, all authorization carriers 32, 36, and 37 are identically configured, namely as authorization cards 33, 38, 39, respectively, in particular as transponders 34, 40, and 41, respectively. The authorization carriers 36 and 37 also include memory elements, having a design identical to the memory element 35, on which access authorizations are in each case stored (not shown). An authorization profile of the authorization carriers 36 and 37 is associated with each of these access authorizations.

With regard to their authorization profiles, the authorization carriers 32, 36, and 37 differ in that the authorization carrier 36 is provided only for operators with "standard experience" and only grants access to elementary basic functions of the scrubber vacuum 10. The authorization carrier 32 is provided for more experienced operators, with whose authorization profile all regular functions of the scrubber vacuum 10 may be accessed. The authorization carrier 37 is reserved for maintenance personnel. With the authorization profile thereof, the maintenance person may access all functions of the scrubber vacuum 10.

To allow an operator to recognize which authorization profile the particular authorization carrier 32, 36, and 37 has, all authorization carriers 32, 36, and 37 include identification devices 42, 43, and 44, respectively, of the same kind. By means of the identification devices 42 to 44, the operator is provided with identifiers 45, 46, and 47, respectively, which may be perceived by the operator via a sensory organ in a reliable and user-friendly manner, and are associated with the particular authorization profile of the authorization carriers 32, 36, and 37, respectively.

All identification devices 42 to 44 are optical identification devices whose identifiers 45 to 47, respectively, are visually perceivable by an operator's sense of vision. The identifiers 45 to 47 are in particular color identifiers which consist in the authorization carriers 32, 36, and 37, respectively, being colored; i.e., the identifiers 45 to 47 each comprise a color being applied to surfaces 48, 49, and 50 of the authorization carriers 32, 36, and 37, respectively. The identification devices 42 to 44 are formed by the surfaces 48 to 50, respectively, having the colored layers thereon which bring about the particular color impression.

Figure 3:
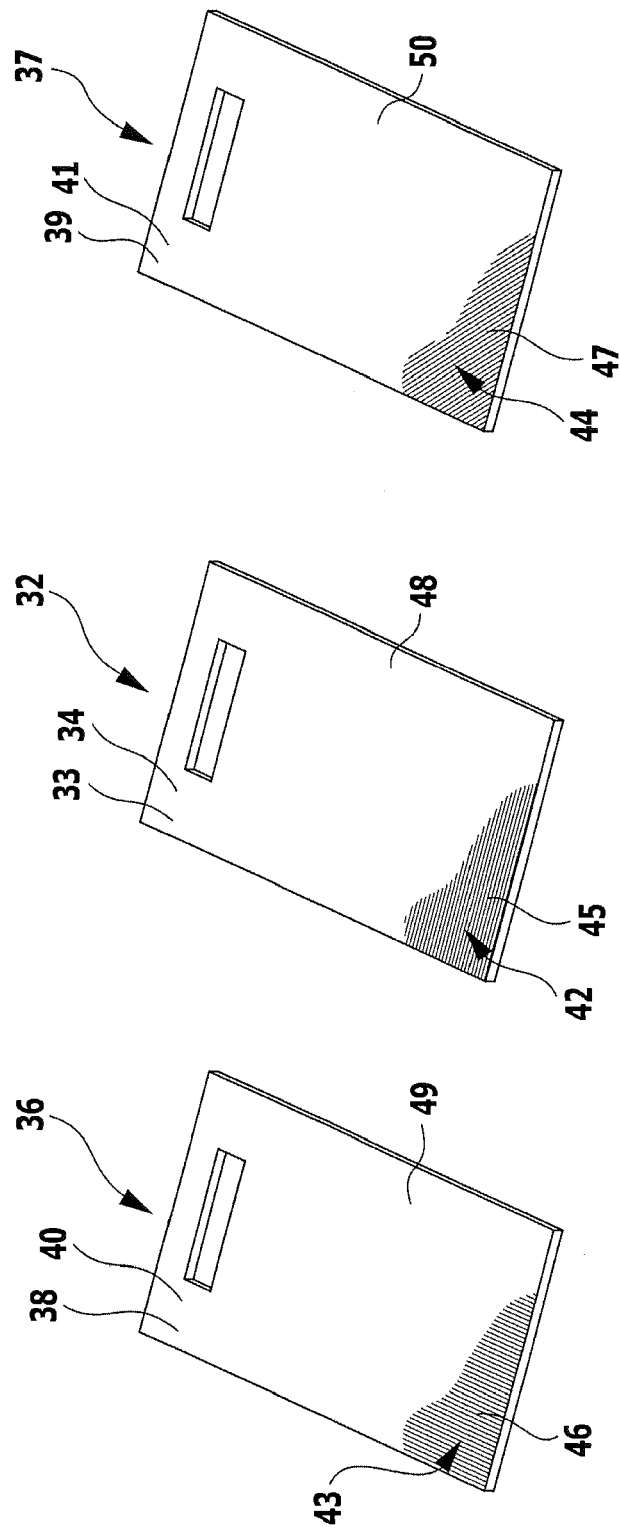
FIG. 3 shows a first group of three authorization carriers of different authorization profiles, each of which grants access to the cleaning appliance from FIG. 1.

The colored identifiers 45 to 47, schematically illustrated in FIG. 3 by different cross-hatching, each extend over the entire surface 48, 49, and 50, respectively. They may thus be visually perceived by the operator in a particularly simple manner, regardless of how the particular authorization carrier 32, 36, and 37 is observed. The surfaces 48 to 50 form, in a manner of speaking, identifier areas of the identification devices 42 to 44, respectively.

For example, in the present case the identifier 45 has a yellow color, the identifier 46 has a red color, and the identifier 47 has a gray color. In the present context, "color" may mean a basic color in general, as well as a specific color, for example in the Pantone color system.

Due to the colored identifier which is visually perceivable in a simple manner, the authorization carriers 32, 36, and 37 may be distinguished by the operator, which simplifies their handling, and thus, the handling of the scrubber vacuum 10 as a whole.

If two or more authorization carriers of the same authorization profile are provided, they preferably have the same identifier, even if the access authorization is different. This results in an unambiguous association of the authorization profile with the identifier, which further simplifies dealing with the authorization carriers of the scrubber vacuum 10.

If the authorization profile of the particular authorization carrier 32, 36, or 37 is known to the control unit 25, the control unit controls the display unit 24 in such a way that authorization information is provided which is linked to the authorization profile of the authorization carrier used. In the present case the authorization information, which is illustrated in FIG. 2 by way of example based on authorization information 51 symbolized by cross-hatch, comprises a display color of the display unit 24 which matches the color of the particular identifier 45 to 47. The authorization information 51 is accordingly a yellow display color of the display unit 24, which matches the yellow identifier 45 of the authorization carrier 32. In the present context, "display color" may be the background color of the display unit 24, or its foreground color, for example for text that is output on the display unit 24. Similarly, when the authorization carriers 36 and 37 are used, the display unit 24 is red and gray, respectively, which matches the identifiers 46 and 47, respectively.

The authorization information is likewise visually perceivable by the operator in a reliable and simple manner. The purpose of the authorization information, for example, is to determine whether the particular authorization carrier used is correctly identified. If the display color differs from the color of the particular identifier of the authorization carrier, a misidentification of the authorization carrier is present. The operator may then have the identifier corrected.

Figure 4:
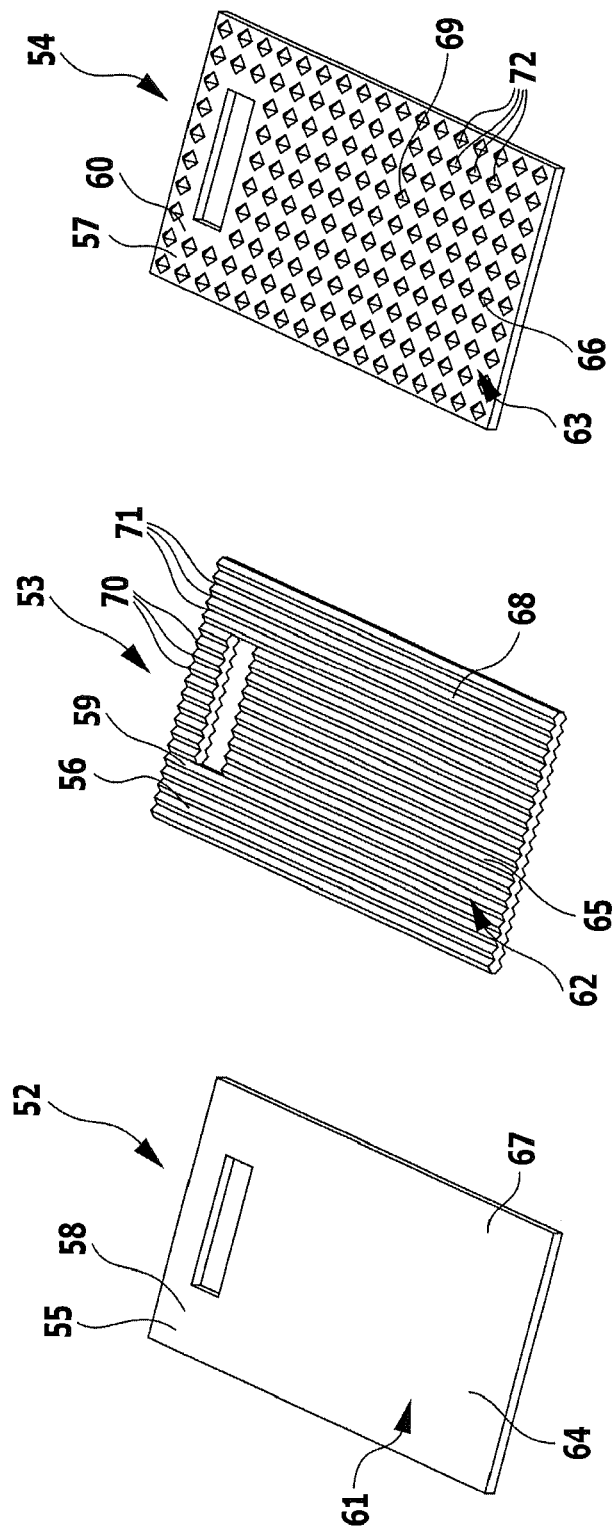
FIG. 4 shows a second group of three authorization carriers of different authorization profiles, each of which grants access to the cleaning appliance from FIG. 1.

Instead of the authorization carriers 32, 36, and 37, a second group of authorization carriers 52, 53 and 54 may be used for the scrubber vacuum (FIG. 4). From a technical standpoint, the authorization carriers 52 to 54 all have the identical design; they are, respectively, authorization cards 55, 56, and 57, and in particular transponders 58, 59, and 60. The authorization carrier 52 is provided for operators with "standard experience," the authorization carrier 53 provided for more experienced operators, and the authorization carrier 54 is reserved for maintenance personnel.

Each of the authorization carriers 52 to 54 includes an identification device 61, 62, and 63, respectively, which in the present case are haptic identification devices 61 to 63. The identification devices 61 to 63 therefore have identifiers 64, 65, and 66, respectively, which are associated with the authorization profile of the respective authorization carrier 52 to 54, and detectable by the operator's sense of touch. The identification devices 61 to 63 are formed by surfaces 67, 68, and 69, respectively, of the authorization carriers 52, 53, and 54, respectively, optionally with elevations and/or depressions present thereon in a certain spatial configuration, each of which brings about an impression that is perceivable by touch.

Each of the identifiers 64 to 66 extends over the entire surface 67, 68, and 69, respectively. In this way, the identifiers in each case may be perceived by the operator via the sense of touch in a reliable, simple, and user-friendly manner. Also in the case of the authorization carriers 52 to 54, this allows the operator to easily detect the authorization profiles thereof.

The identifier 64 comprises a smooth configuration of the surface 67, entirely without depressions and/or elevations. On the other hand, the identifier 65 comprises alternating ribbed elevations 70 which are separated from one another by grooved depressions 71. The elevations 70 and the depressions 71 each extend in the longitudinal direction of the authorization carrier 53. The identifier 66 comprises a multiplicity of identical pyramidal elevations 72 which are uniformly distributed over the surface 69 in a checkered manner.

For further groups of authorization carriers which may be used in the scrubber vacuum 10, acoustic, olfactory, or gustatory identification devices may be provided, to which the sense of hearing, the sense of smell, or the sense of taste, respectively, of an operator responds. It may also be provided that identification devices are used within a group of authorization carriers to which different sensory organs of an operator respond. For example, optical and haptic identification devices may be present mixed with one another.

Multiple identification of an authorization carrier is also possible. For example, a colored identifier could additionally be provided for the authorization carriers 52 to 54. This would provide redundancy of identifying information, which may increase the reliability of the operator's perception of the authorization profile linked to the particular authorization carrier.

The invention claimed is:

1. A cleaning system comprising a cleaning appliance and three or more authorization carriers, wherein in order to access the cleaning appliance an access authorization stored on an authorization carrier is required,
   wherein the three or more authorization carriers with access authorizations stored thereon are linked to different authorization profiles,
   wherein the cleaning appliance comprises a detection unit for detecting the access authorization of an authorization carrier,
   wherein a range of functions dependent on the authorization profile linked to the access authorization is provided to an operator by the cleaning appliance,
   wherein each authorization carrier comprises an identifier which is associated with the particular authorization profile of the authorization carrier and which is perceivable by the operator using a sensory organ,
   wherein identifiers associated with different authorization profiles are different from one another,
   wherein the cleaning appliance is a floor cleaning machine,
   wherein the cleaning appliance includes an optical display and a controller for display of authorization information associated with the authorization profile of an authorization carrier used by the operator for accessing the cleaning appliance,
   wherein at least two of the three or more authorization carriers have the same authorization profile and identical identifiers,
   wherein the identifiers of the three or more authorization carriers are perceivable using the same sensory organ,
   wherein the identifiers of the three or more authorization carriers are visually perceivable identifiers,
   wherein the visually perceivable identifiers are a color,
   wherein the identifier of each of the three or more authorization carriers is situated on a surface of each of the three or more authorization carriers,
   wherein the identifiers of the three or more authorization carriers are unchanging with respect to at least one of space and time, and
   wherein the three or more authorization carriers are transponders, each having a memory element for the access authorization, and wherein the access authorization is detectable in each case in a contactless manner by means of the detection unit.

2. The cleaning system according to claim 1, wherein the identifier of at least one of the three or more authorization carriers is perceivable by touch.

3. The cleaning system according to claim 2, wherein the identifier which is perceivable by touch comprises at least one of elevations and depressions which are formed on the authorization carrier.

4. The cleaning system according to claim 1, wherein the identifier of at least one authorization carrier is an always perceivable identifier.

5. The cleaning system according to claim 1, wherein the identifier of at least one of the three or more authorization carriers extends over the entire surface of the at least one authorization carrier.

6. The cleaning system according to claim 1, wherein in the case of an identifier of the authorization profile of the authorization carrier based on a color, the authorization information is a display color of the optical display.

7. The cleaning system according to claim 6, wherein the color of the identifier and the display color match.

\* \* \* \* \*